United States Patent Office 3,240,614
Patented Mar. 15, 1966

3,240,614
BONDED BORON NITRIDE
Yorihiro Murata, Lewiston, and Robert Labosky, Niagara Falls, N.Y., assignors to The Carborundum Company, Niagara Falls, N.Y., a corporation of Delaware
No Drawing. Filed Sept. 19, 1963, Ser. No. 310,521
10 Claims. (Cl. 106—39)

This application relates to bodies of boron nitride and is particularly concerned with bodies containing boron nitride that are usable for dielectric purposes and that have good resistance to moisture and excellent electrical properties.

In the electrical industry there has for a long time been a need for an insulating material that combines the characteristics of a high dielectric constant, a low dissipation factor, good resistance to thermal shock, good resistance to moisture, good strength, high density, and machinability. Hitherto insulators or insulating compositions combining these properties have not been available. Among the insulating materials commonly used in demanding types of service are porcelain, steatite porcelain, sintered alumina, fused silica, and borosilicate glass. Porcelain has a high dissipation factor and poor thermal shock resistance. Steatite porcelain has poor thermal shock resistance and, because of instability of $MgSiO_3$ when exposed to moisture, poor electrical properties in service. Although fused silica has good electrical properties and excellent resistance to thermal shock, it is quite expensive and very fragile. Sintered alumina also has good electrical properties but less resistance to thermal shock and it, likewise, is expensive and rather fragile. Borosilicate glass has reasonably good electrical properties but is unstable in water and is relatively fragile. Furthermore, none of these materials is easily machined. Machinability is important because the complex shapes and/or close tolerances necessary in many electrical insulation uses of ceramic materials can only be obtained economically by machining. While grinding and the like can be used to shape the ceramics hitherto used for electrical insulation, the fragility of these materials makes such operations difficult and slow.

Accordingly it is an object of the present invention to provide electrical insulating bodies that combine good physical properties with good electrical characteristics.

Another object of the invention is to provide electrical insulating bodies that are stable and strong but easily machined.

A further object of the invention is to provide electrical insulating bodies that can be conveniently and inexpensively formed.

Still another object of the invention is to provide electrical insulating bodies of novel composition and characteristics.

Other objects and advantages of the present invention will be apparent from the following description thereof.

The above-mentioned objects are achieved by the use of hot pressed bodies consisting essentially of recrystallized boron nitride and silica glass.

Boron nitride (BN) as it usually occurs is a fine, white or grey powder with a slippery feel which melts or decomposes at about 3000° C. and can be heated to well above 2000° C. in an inert atmosphere without decomposition. Boron nitride is a good refractory and a nonconductor of electricity and, because of its slippery nature has been used as a heat-resistant lubricant.

Boron nitride produced by known methods such, for example, as that set forth in U.S. Patent No. 2,839,366, issued to Kamlet as assignor to National Distillers and Chemical corporation, has when dry a dielectric constant (K) of about 4.2 (at 25° C. and 1 kc.) and a low dissipation factor. Such boron nitride can be shaped by hot pressing in a refractory mold, such as one of graphite, in accordance with known procedures to form easily machinable electrical insulating bodies. However, such bodies are quite sensitive to water and the electrical properties of such bodies when wet are quite poor. Heat treatment at about 1000° C. makes boron nitride more resistant to high temperature oxidation but such treatment of the powder, sometimes called stabilization, does not overcome the deleterious effects of moisture on the electrical properties of molded bodies formed therefrom. These deleterious effects are attributed to the presence of boric oxide ($B_2O_3$) or of substances that hydrolyze to form boric oxide. Apparently, even in stabilized boron nitride boric oxide is available in the presence of water.

It has been found possible by recrystallizing boron nitride to obtain a product in which essentially no free $B_2O_3$ can be found even after exposure to boiling water for six days. The recrystallization may be carried out by heating the boron nitride to a temperature in excess of 1800° C., and preferably to about 2000° C., but below the decomposition point thereof for a time sufficient to permit recrystallization. In general, a time of about one hour at temperatures in the lower portion of the range given above is satisfactory. Although, as stated above, the recrystallized boron nitride is stable under prolonged exposure to boiling water, it has been found unfeasible to hot press it into insulating bodies. Consequently no useful dielectric bodies of pure recrystallized boron nitride have been produced.

The present invention, however, makes possible the production of electrical insulating refractory bodies from mixtures of recrystallized boron nitride and silica. Such bodies have a dielectric constant (K) of about 4 at 1 kc. and 25° C. and a dissipation factor of about $4 \times 10^{-4}$, are substantially unaffected by moisture, are extremely resistant to heat shock and within wide limits of silica content may be readily machined. They thus have all of the characteristics desired in a ceramic dielectric material. At the same time they are relatively inexpensive.

Bodies of the type with which the present invention is concerned are formed by hot pressing the mixtures of silica and recrystallized boron nitride in a nitrogen atmosphere. In the following example there is described in detail the production of a body of this type.

*Example I*

Forty parts of finely divided (average particle diameter=1–5μ), recrystallized boron nitride were thoroughly mixed with 60 parts of fine silica powder (average particle diameter=1–5μ) and placed in a graphite mold suitable for forming cylinders 4" x 4". The mold was closed, placed in a furnace suitable for hot pressing and heated in a stream of nitrogen to 1750° C., the nitrogen protecting the mold from oxidation. A forming pressure of 2000 p.s.i. was then applied and maintained for 90 minutes. Thereafter the mold was allowed to cool and a cylinder was obtained from which test specimens could be easily cut with ordinary carbide-tipped tools.

The product obtained had a density of 2.20 g./cc. and was offwhite in color with a smooth surface. Electrical tests of insulator specimens obtained from the ceramic body showed a K of 3.5 at 1 kc. and 25° C., and a dissipation factor in the dry state of $3.0 \times 10^{-4}$. On refluxing a quantity of finely ground product in distilled water for 48 hours and filtering off the product a filtrate was obtained in which $B_2O_3$ was not detected. The stability of the product in water is thus demonstrated. Confirmation of this is shown by the fact that when a sample was immersed in water for 6 days at 20° C., wiped dry, and tested within 4 minutes the K was still 3.5 at 1 kc. and 25° C. and the dissipation factor was only $3.3 \times 10^{-4}$.

The composition of bodies comprehended by the invention can vary within a moderately wide range. This is illustrated by the following examples.

*Example II*

Sixty-five parts of finely divided, recrystallized boron nitride were thoroughly mixed with 35 parts of fine silica powder and the mixture was loaded into a graphite mold suitable for hot pressing. The filled mold was heated in nitrogen to 1750° C. and a pressure of 2000 p.s.i. was applied and maintained for 90 minutes. The mold was cooled and the hot pressed body was removed. Test insulator specimens were easily cut from the body with ordinary carbide-tipped tools. Such specimens showed a dielectric constant of 3.37 at 25° C. and 1 kc. and a dissipation factor of $9.2 \times 10^{-4}$.

*Example III*

Using a mixture of 60 parts of finely divided, recrystallized boron nitride and 40 parts of finely divided silica, a body was hot pressed using substantially the same apparatus and procedure set forth in Example II. The ceramic, insulating body obtained had a K of 3.87 at 1 kc. and 25° C. and a dissipation factor of $1.4 \times 10^{-4}$.

As indicated by the foregoing examples the composition of the present novel bodies is preferably within the range of 35%–60% silica, 40%–65% boron nitride. It has been found, however, that bodies of this type in which the boron nitride content is as high as 70% or as low as 30% have desirable properties and are useful for certain purposes.

Bodies of the type with which the present application is concerned are quite dense, having specific gravities of about 2.16 or higher, are easily machined, i.e., they may be readily shaped by conventional procedures using conventional carbide tools, are very resistant to deterioration by water, and have a structure characterized by finely divided particles of boron nitride as a dispersed phase in a continuous phase of a glassy matrix which is essentially silica. The glass matrix appears to wet the boron nitride particles without attacking them and there appears to be no tendency toward devitrification.

In respect to their electrical characteristics the bodies have dielectric constants (K) at 25° C. and 1 kc. within the range from 2.5 to 4.5 and have dissipation factors when dry of from $1 \times 10^{-4}$ to $10 \times 10^{-4}$. The bodies are quite resistant to oxidation, withstanding heating in air at 1000° C. for more than three days with only very slight loss as compared with a hot pressed body formed of boron nitride only. Prolonged exposure to an oxidizing atmosphere even at 1100° C. is possible without incurring prohibitive losses. The bodies comprehended by the present invention are also notable for their relatively good strength and their excellent resistance to thermal shock. The strength is in the order of 15,000 p.s.i. at room temperatures.

In determining resistance to thermal shock test specimens cut from a body like that of Example I were alternately heated to 1400° C. and rapidly cooled. No oxidation, cracking, or deformation was perceptible after 20 cycles of this treatment followed by immersion of the hot specimens in cold water. It is, therefore, apparent that the bodies have excellent thermal shock resistance. Measurements of the thermal expansion of bodies according to the invention have shown a very low coefficient and much less of an anisotropic characteristic than is found in ordinary hot pressed boron nitride. The thermal conductivity of bodies according to the invention is high, i.e., of the order of 100 B.t.u./ft.$^2$-hr.-°F./in.

The procedure set forth in the examples for forming bodies according to the invention is subject to modification and variation. Thus, for example, the pressing conditions may be changed in respect to pressure, temperature and time. A pressure of at least 2000 p.s.i. is ordinarily preferred to obtain the desired density in the bodies and in the lower portion of the preferred temperature range a pressure of 4000 p.s.i. or more may be convenient and permit reduction of the pressing time. At higher temperatures, 2000 p.s.i. is usually sufficient, although when properly applied somewhat lower pressures may be used. Of course, quite high pressures can be used if desired but such pressures generally are not necessary or particularly helpful. It will also be obvious that the particle size of the recrystallized boron nitride and that of the silica may be varied within reasonable limits which will be recognized by those skilled in the art.

To obtain bodies of the desired characteristics a hot pressing temperature in the range from about 1700° C.–1800° C. is preferred. In some cases higher temperatures can be used but temperatures lower than 1700° C. are usually impractical. Generally a temperature of about 1750° C. is found most satisfactory. At such a temperature and with a pressure of about 2000 p.s.i. bodies with specific gravities about 2.16 or higher can be readily obtained by pressing for about 30 minutes. As would be expected the time required to obtain the desired bodies decreases with higher temperature and higher pressure and vice versa. It may be mentioned here that after hot pressing the bodies should be cooled at such a rate as to avoid or prevent devitrification of the silica glass.

Ideally, bodies comprehended by the present invention consist only of boron nitride and silica. In most cases, however, the silica and/or the boron nitride used will include some minor constituents or contaminants such as $MgO$, $Al_2O_3$, $BaO$, and $B_2O_3$. When these are present in very small amounts, i.e., of the order of fractions of a percent, they become part of the glass phase and are for most purposes not troublesome. However, some of these impurities form combinations that tend to decrease the resistance of the glass phase to water and, therefore, if present in substantial quantity, will influence the electrical properties of the bodies unfavorably. It will be understood, nevertheless, that hot pressed bodies of boron nitride bonded with silica glass are in many respects improved over straight boron nitride bodies even though in some respect they do not have the maximum desired characteristics.

As indicated above, electrical insulating bodies and articles may be molded directly by the process of the invention or may be readily machined from larger bodies. Small machined insulators are of particular interest since they have a good surface which can be easily given the smooth finish necessary for use as substrates for thin-film circuits and in micro-circuit modules. Their high thermal conductivity is of interest in the latter use.

Percentages and parts as specified and/or referred to herein are, except as otherwise indicated, percentages and parts by weight.

We claim:

1. A hot pressed, easily machinable, thermal shock resistant body consisting essentially of boron nitride and a glassy matrix which is essentially silica in which the boron nitride is recrystallized and comprises from 30% to 70% of said body.

2. A body as set forth in claim 1 in which said boron nitride is uniformly dispersed as fine particles in said matrix.

3. A body as set forth in claim 1 which is characterized by a specific gravity of at least 2.16.

4. A body as set forth in claim 1 in which the boron nitride comprises 40%–65% of said body.

5. A thermal shock resistant ceramic insulator comprising a hot pressed, easily machinable body having a specific gravity of at least 2.16, which consists essentially of recrystallized boron nitride particles dispersed in a glassy matrix consisting essentially of silica, said insulator being characterized by a dielectric constant of from about 2.5 to 4.5 (measured at 1 kc. and 25° C.) and a dissipation factor of from $1 \times 10^{-4}$ to $10 \times 10^{-4}$, said particles comprising from 30% to 70% of said body.

6. An insulator as set forth in claim 5 which is substantially unaffected by water.

7. An insulator as set forth in claim 5 in which the boron nitride comprises 40%–65% of said body.

8. A raw batch for forming a thermal shock resistant, hot pressed boron nitride-silica body which consists essentially of from 30%–70% finely divided silica and from 70%–30% finely divided, recrystallized boron nitride.

9. A raw batch as set forth in claim 8 in which the silica comprises 35%–60% of said batch and the boron nitride comprises 65%–40% of said batch.

10. A process for forming thermal shock resistant, easily machinable, ceramic bodies consisting essentially of boron nitride and a glassy matrix which is essentially silica which comprises forming a mixture of finely divided recrystallized boron nitride and finely divided silica, hot pressing said mixture at a temperature of at least about 1700° C. for such a time and under such pressure as to produce a specific gravity in the pressed body of at least about 2.16 and then cooling said body at such a rate as to avoid devitrification of the said matrix.

References Cited by the Examiner
UNITED STATES PATENTS

| | | | |
|---|---|---|---|
| 2,855,316 | 10/1958 | Taylor | 106—46 |
| 2,887,393 | 5/1959 | Taylor | 106—55 |
| 3,041,205 | 6/1962 | Iler | 106—69 |
| 3,058,809 | 10/1962 | Taylor | 106—55 |

TOBIAS E. LEVOW, *Primary Examiner.*